March 9, 1965 | H. E. KALLMANN | 3,173,111

DELAY LINE

Filed May 24, 1961 | 3 Sheets-Sheet 1

INVENTOR.
Heinz E. Kallmann

BY
Michael S. Striker
Attorney

March 9, 1965 H. E. KALLMANN 3,173,111

DELAY LINE

Filed May 24, 1961 3 Sheets-Sheet 2

INVENTOR.

Heinz E. Kallmann

BY

Michael S. Striker

Attorney

March 9, 1965 H. E. KALLMANN 3,173,111

DELAY LINE

Filed May 24, 1961 3 Sheets-Sheet 3

INVENTOR.
Heinz E. Kallmann
BY
Michael S. Striker
Attorney

United States Patent Office 3,173,111

Patented Mar. 9, 1965

3,173,111
DELAY LINE

Heinz E. Kallmann, 417 Riverside Drive, New York, N.Y.

Filed May 24, 1961, Ser. No. 112,371
12 Claims. (Cl. 333—31)

The present invention relates to electrical delay lines of the distributed-parameter type and to methods of manufacturing such delay lines.

It is an object of my invention to provide delay lines with improved electrical characteristics.

It is another object of my invention to provide delay lines with very stable electrical parameters.

It is a further object of my invention to provide delay lines whose parameters can be determined before assembly.

It is still another object of my invention to provide delay lines that may have very large distributed capacitance, and thus may have very low impedance.

It is still a further object of my invention to provide delay lines of simple structure, small dimensions and light weight.

It is another object of my invention to provide delay lines that can be very efficiently and consistently mass produced.

It is still a further object of my invention to provide a variable delay line whose delay may be adjusted with extremely fine resolution.

The novelty of electrical delay lines according to the present invention mainly consists in the provision of a thin sheet of dielectric material having patterned metal film electrodes deposited on both of its faces. This sheet is wrapped around a core of non-conducting material, the metal film on the inside forming the grounded electrode of the distributed shunt capacity and the metal film on the outside forming at least part of the helical coil providing the part of the series inductance facing the grounded electrode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
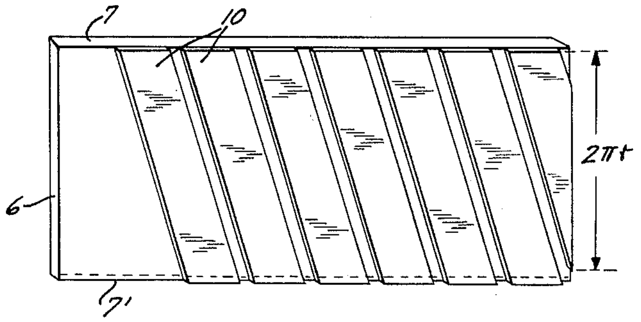
FIG. 2 shows the outer face of a dielectric sheet, according to one embodiment, with patterned metal film deposit that is to form the outside electrode.
Figure 6:
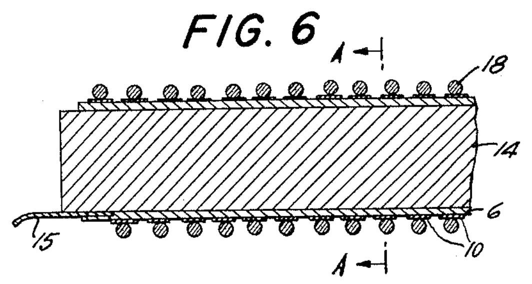
FIG. 6 shows a longitudinal section through the delay line according to the embodiment of FIG. 2, with the dielectric sheet wrapped around a core and a wire coil wound around the sheet.
Figure 7:
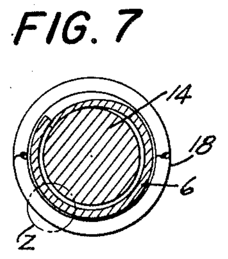
FIG. 7 shows a transversal section A—A of the delay line of FIG. 6.
Figure 8:
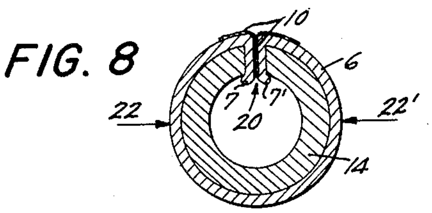
Figure 7A:
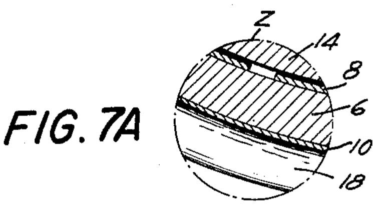
Figure 9:
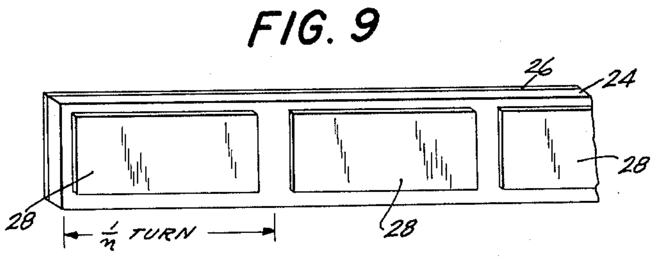
Figure 10:
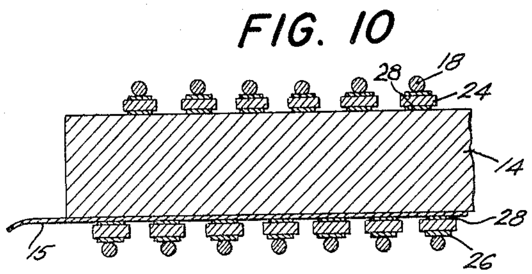
Figure 8A:
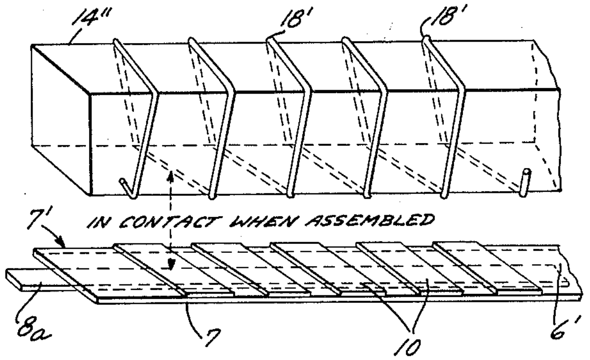
Figure 11:
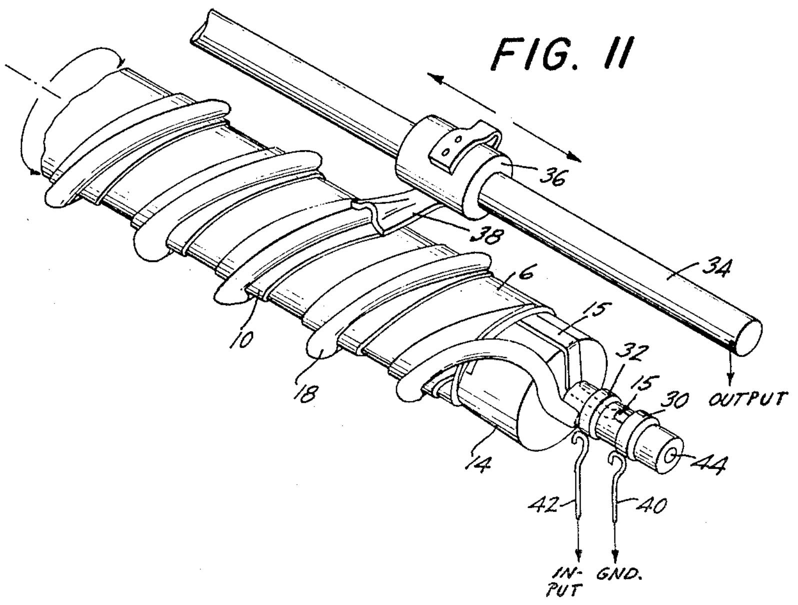

FIG. 7*a* shows an enlarged portion—encircled by broken line Z of FIG. 7;

FIG. 8 shows a transversal cross section of a delay line embodying the sheet of FIG. 2 but asembled differently from FIG. 7;

FIG. 8*a* shows in an exploded perspective view another embodiment with a dielectric sheet member carrying electrodes and, when assembled, being pressed with one set of electrode members in contact with, and against, a flat part of the circumference of a helical coil of rectangular cross-section;

FIG. 9 shows in perspective, at exaggerated thickness, a portion of a dielectric tape according to another embodiment of the invention with solid metal film deposited on one face and a patterned metal film deposited on its other face;

FIG. 10 shows a longitudinal section through a delay line with the dielectric tape of FIG. 9 wound around a non-conducting core and a wire helix wound over the dielectric tape; and FIG. 11 shows in perspective view one end of a delay line according to FIG. 6 as part of a variable delay line with a grounded electrode and one end of the series inductance, each connected to a slip ring, and a pick-off contact riding on the wire helix.

Like numerals designate like objects in all drawings.

Figure 1:
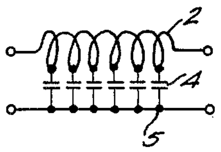
FIG. 1 is the electrical circuit diagram of a delay line.

Electrical delay lines may serve to delay electrical signals of frequencies up to tens of megacycles for a time T of the order of microseconds. In general, such lines comprise a single-layer helical coil of insulated wire forming one conductor, wound on a cylindrical core of non-conducting material over one or more longitudinal metal strips connected to ground. The term "ground" here and hereafter denotes that the respective terminal of the delay line is common to input and output. Thus, as shown in the circuit diagram of FIG. 1, the turns 2 of the helical coil form shunt capacities 4 wherever they cross the longitudinal grounded metal strips 5. The insulation of the wire and the air space between the insulation and the metal strips then form the dielectrics of these capacities. If L in henrys is the total inductance of the helical coil and C in farads its total capacitance to ground, then the time delay in seconds is $T=\sqrt{LC}$ and the impedance of the line in ohms is $Z=\sqrt{L/C}$. Such lines can conveniently be made for impedances above about 200 ohms. At lower impedances, it has hitherto been all but impossible to provide the then required large capacitances with the then available very few turns. In all delay lines of this type, the attenuation of higher frequencies is severe, due to dielectric losses in the wire insulation; and since this distributed capacitance depends on the spacing between the wire and the metal strips, it depends much on the tension with which the wire helix is wound, thus is not closely predictable and unstable with time and temperature changes as the wire helix loosens.

The present invention permits manufacture of improved delay lines with very low dielectric losses, and with predictable and very stable distributed capacitance, thus very stable impedance and delay characteristics. This is achieved by the use of a sheet of low-loss and very stable dielectric material and by a configuration which confines the whole distributed capacitance within this dielectric sheet. Thus, to eliminate all, possibly varying, air space between the grounded electrodes and the part of the helical conductor which it faces, both the gorunded electrodes and that part of the helical conductor are formed as metal film deposits on the opposing faces of the dielectric sheet and in permanent and intimate contact with it.

A delay line according to the present invention comprises essentially three parts: a dielectric sheet with patterned metal film deposits on both of its faces; a smooth, referably cylindrical core of non-conductive material around which this sheet is wrapped; and a metal conductor such as a wire helix forming part of the series inductance.

FIG. 2 shows with reference to one embodiment, the intended outer face of a sheet 6 of dielectric material, a rectangle of a length at least equal to that of the delay line and of a width slightly exceeding $2\pi r$ if $r$ is the radius of the delay line to be produced. The dielectric material may be a sheet of e.g. polystyrene as thin as .001″ or of a polyester such as known by the trade name "Mylar" as thin as .00025″. The metal film deposited on its intended outer face is patterned to form parallel strips 10 with straight and parallel edges, all equally wide and evenly spaced. They may extend substantially the full length from one longitudinal edge 7 to the other 7′ and they all form with these edges an angle very close to 90°, but preferably over 85°. The center-to-center spacing of these strips is made equal to the pitch of the intended helical series inductance. Each strip may typically cover 70% of this spacing and thus leave 30% of the spacing as a clear gap. Such patterned metal deposit may be formed by masking during the metal depositing process or by depositing a solid coating and then etching, abrading, burning-off or otherwise removing the unwanted areas of the metal. Such metal may, for instance, be aluminum, copper, gold or silver and the deposit may be a few microinches thick, for a resistivity not exceeding a few ohms per square unit.

Figure 3:
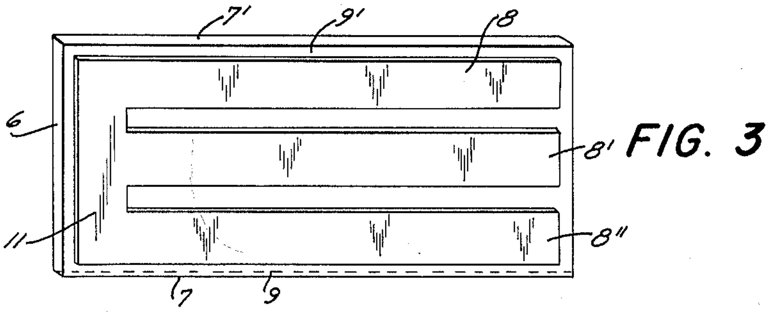
FIG. 3 shows the inside face of a dielectric sheet, according to the embodiment of FIG. 2, with patterned metal film deposit that is to form the inside electrode.

FIG. 3 shows the intended inner face of the same sheet as that shown in FIG. 2. On this face is deposited a patterned metal film intended to form the grounded electrode of the delay line. This electrode may cover the whole width between the longitudinal edges 7 and 7′ of sheet 6 except for narrow clear insulating margins 9 and 9′ or may be divided into parallel strips such as 8, 8′, 8″ as shown, of constant width over the partial length of the sheet 6 over which the electrode strips 10 extend on the opposite face of the sheet. All strips 8, 8′, 8″ are connected with each other by bridge 11 of deposited metal film in a region where there are no strips 10 on the opposite face of the sheet 6. The grounded electrodes 8, 8′, 8″ and the bridge 11 may consist for instance of any of the metals mentioned for strips 10 and of comparable thickness, patterned e.g. by one of the processes mentioned above.

Figure 4:
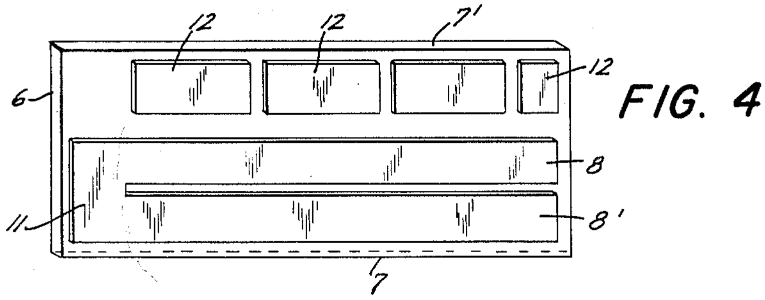
FIG. 4 is similar to FIG. 3 but also shows floating deposited metal film patches for delay equalization.

FIG. 4 shows a variant of FIG. 3 wherein only a portion of the surface between longitudinal edges 7 and 7′ is covered by grounded electrodes 8, 8′. The space left over may be occupied by a series of "floating" capacitive patches 12, of e.g. the same material and thickness as strips 8, 8′ and bridge 11 and likewise formed in the manner set forth. The delay of delay lines tends to decrease with increasing frequencies and such patches serve to equalize delay over wide frequency ranges, as disclosed and explained in my U.S. Patent No. 2,461,061 of February 8, 1949.

Figure 5:
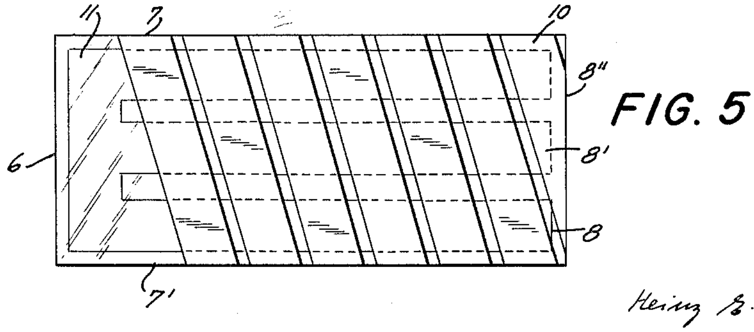
FIG. 5 shows a transparent dielectric sheet, according to the embodiment of FIGS. 2 and 3 with both the inside and outside patterned metal film deposits in a preferred mutual spatial or positional relationship.

FIG. 5 shows a transparent dielectric sheet as in FIGS. 2 and 3 in top view showing the strips 10 on the top surface and the grounded electrodes 8, 8′, 8″ and the bridge 11 on the opposite surface but visible through the transparent sheet 6. With proper positional or spacial relation between the electrodes on both faces of the sheet 6, there are no strips 10 superposed over the bridge 11 and the rhomboidal areas where the strips 10 are superposed over grounded electrodes 8, 8′, 8″, respectively, now yield the distributed capacities indicated by 4 in the schematic diagram of FIG. 1.

In order to distinguish more easily the two different electrode patterns on a transparent film while handling it in manufacture, the electrodes may conveniently be made of differently colored metals or the surface of one of the metal film electrodes may be flash-plated electrolytically with a differently colored metal.

In order to form a delay line with a helical series inductance, the sheet 6 with its patterned electrodes, as shown in FIG. 5, is wrapped around a smooth cylindrical core 14 of non-conductive material (see FIGS. 6, 7, 8) of radius $r$ and a length at least equal to that of the whole delay line.

As noted above, the distance from edge 7 and 7′ preferably exceeds the circumference of the core 14 and allows for a slight overlap along the longitudinal edges of the wrapped sheet. Either the angle between strips 10 and edges 7 and 7′ is so chosen, or the whole sheet 6 is so skewed by a small angle in wrapping it around the cylindrical core that the end of each strip 10 near edge 7 just meets the end of one of its neighboring strips 10 at the edge 7′, so that the total number of strips constitute a smooth and continuous helix, irrespective of whether the inner electrodes 8, 8′, 8″, are then parallel with the delay line axis or slightly skewed since this is immaterial. FIG. 6 shows in longitudinal section the cylindrical core 14 with sheet 6 wrapped around it, with a grounding metal foil tab 15 inserted e.g. beneath bridge 11, to make contact with the inner electrode pattern. The section FIG. 6 also shows (in greatly exaggerated thickness) the metal film strips 10 on the outer face of sheet 6. At the points of overlap, where one end of each strip 10 meets the opposite end of its neighbor strip these two ends are actually insulated from each other by the thickness of the overlapping margin of dielectric sheet 6. To complete the helix, according to this invention, a bare metal wire 18 is helically wound upon the wrapped sheet 6, for the full length of the delay line to form a helical coil, with a pitch equal to that of the helix formed by strips 10 and with the wire turns 18 approximately centered upon the strips 10. It is not necessary that this wire coil 18 be tight or smooth or accurately centered upon the strips 10 as long as each of its turns makes contact at least at one place, respectively, with each strip element 10. This wire coil provides electrical continuity from each strip element 10 to its neighbors and completes the coil forming the series inductance. Its ends are anchored on core 14 and form the input and output terminals (not shown) of the series inductance. Preferably, the wire 18 is of a diameter smaller than the width of a strip 10 so that it need not be centered upon it yet is fully shielded by it from the grounded electrodes 8, 8′, 8″. Thus it contributes no distributed capacitance to the grounded electrodes and an inaccurate position thereof relative to the center line of the strips 10 cannot affect the total capacitance of the line.

FIG. 7 shows a cross-section, at A—A of FIG. 6, through such a delay line and FIG. 7a shows enlarged the area Z of FIG. 7 encircled by broken line Z, with core 14, grounded electrode 8, sheet 6, strips 10 and wire 18 around these. Protection of the line e.g. by dipping in an insulating coating (not shown) completes the delay line.

Its inductance L is well defined by the number of turns, diameter and length of the wire helix; its capacitance C is wholly defined by the area where the metal deposits or layers on the outer and inner faces of the film are superposed, though separated, and is adjusted before the line is assembled, for instance, by adjusting the width of strips 8, 8′ and/or 8″. The outer metal electrode may have gaps or holes wherever it is not in superposition over the inner electrode provided only that each part of each of its strip elements 10 makes at least in one place contact with the respective wire turn 18.

The delay of a finished line may be adjusted by unwinding one or a few turns of the wire helix.

In a typical example, a delay line may provide .5 microsecond delay at 50 ohms impedance. It has a core of steatie rod of ⅜″ diameter and 5″ long. The dielectric sheet is polyester of the type known by the trade name "Mylar," .00025″ thick, with dielectric constant 3.1. The coil consists of gold-plated copper wire .016″ thick, space-wound with 37.2 turns per inch to a total of 186 turns. The outer electrode comprises metal film strips 10 of corresponding number and with a spacing to cover 70% of the pitch being thus each about .019″ wide. The grounded inner metal film covers about 90% of the circumference so that the areas of superposition cover about 62% of the whole cylindrical surface involved.

In an alternative assembly, the same sheet 6 with patterned electrodes may be used but as shown in cross-section FIG. 8, the cylindrical non-conducting core is now a tube 14 with a straight, narrow, smooth slot 20 along its whole length. Instead of overlapping, both longitudinal margins along edges 7 and 7' are folded into the slot 20 so that the outer surfaces of the external metal film strips 10 now touch each other, the sheet being again so skewed or positioned that the one end of one metal film strip 10 just faces the opposite end of one of its neighboring strips 10. By means of pressure as indicated by arrows 22 and 22', the slot 20 is closed tight and thus good electrical continuity between juxtaposed ends of consecutive strips 10 is provided. In order to bridge the resulting pressure contacts permanently and so as to reduce the ohmic resistance of the helix so formed, the whole metallic outer electrode pattern may be heavily electroplated e.g. with copper. Additional winding of a wire helix is then not required.

In another embodiment of this invention, the dielectric sheet with patterned metal film electrodes may extend only along a part of the circumference of the coiled wire inductance, and it may be applied to its inside or to its outside. FIG. 8*a* shows in exploded perspective view a coiled wire inductance 18' of rectangular cross-section, wound on a non-conducting rectangular core 14''. Dielectric sheet 6' is a strip of at least the same length as the coil 18' and of a width comparable to that of one rectangular coil face; but it may also be somewhat narrower or wider. On the face of the strip 6', positioned to make contact with the coiled wire 18', there are metal film strips 10 deposited with a center-to-center spacing equal to the pitch of the coil 18', extending substantially from one longitudinal edge 7 to the other longitudinal edge 7'; when strip 6' is assembled with coil 18', they are each to make contact with one different turn of the coiled wire, respectively. On the opposing face of the strip 6' there is a longitudinal metal film electrode **8*a* extending from end to end and adapted to be connected to ground, and of such a width that the areas where it faces at least portions of the strip electrodes 10** provide the desired shunt capacitance.

In another embodiment of this invention, the rectangular dielectric sheet 6 with patterned metal electrodes of FIG. 5 is replaced by a tape of like dielectric sheet material, as shown at 24 in FIG. 9. The tape 24 may, for instance, consist of a polyester sheet material known by the trade name "Mylar," of constant width somewhat less than the pitch of the intended delay line coil. One of its faces, to constitute the outside, may be wholly covered by a deposited metal film 26 of e.g. any aforementioned metal and preferably in a somewhat thicker layer. The intended inside face is covered with a patterned metal film deposit, of e.g. any of the aforementioned metals and of similar thickness. The pattern consists of oblong rectangular patches 28 extending transversely from edge to edge of the tape 24 but leaving a clear margin for insulation. By masking, etching, abrading or burning these patches 28 are limited to such a length that one patch length together with the width of one of the gaps separating consecutive patches adds up to $2\pi r$ for a delay line of radius $r$ or to a fraction of $1/n$ of this length, where $n$ is a small integer such as 2, 3, 4. As shown in FIG. 10, this tape is wound as a helix with the desired pitch with e.g. one patch 28 per turn, around a non-conducting cylindrical core 14 and over at least one grounding tab or strip 15 of metal foil extending the whole length of the delay line, with patches 28 facing inward with all said gaps aligned, and each patch making contact with tab 15. If there are $n$ patches per turn, $n$ grounding tabs or strips like tab 15 (not shown) will be required, each tab grounding, respectively, all patches 28 in one of the aligned rows thereof along the delay line. Unless the conductivity of the outer metal film 26 suffices for providing low series resistance, a bare copper wire 18 may be wound with identical pitch, and approximately centered, upon the helical outer metal film 26 so as to reduce the ohmic resistance between input and output terminals (not shown) of the inductance coil.

While the large available distributed shunt capacitance permits manufacture of such delay lines of very low impedance, the described design also provides lines of high impedance, if so desired, and with improved electrical characteristics. To this end the non-conducting core 14 is made of a material such as a ferrite having permeability with low losses at the frequencies under consideration. The inductance will thus be multiplied by the permeability $\mu$, and the resulting line impedance will be multiplied by $\sqrt{\mu}$. Just as a coil of few turns on a low-loss ferrite core is found to have less losses than a coil of the same inductance without ferrite core but more turns, so a delay line as described, with ferrite core, will have less losses than the conventional type of the same impedance.

A variable delay line differs from a fixed delay line by having an additional output terminal in the form of a wiping or sliding contact movable along a bare portion of the inductance parallel to its axis, similar to a potentiometer. With the present conventional design of variable delay lines, the wire of the coil may not be very fine or else it would be damaged by the wiping contact. With coarser wires, the delay unit delay line length is not as large as desirable and if a ferrite core were used to increase the inductance per turn, the increment in delay from one turn to the next would be too coarse. The type of delay line here disclosed lends itself very well to provide compact and rugged variable delay lines with extremely fine resolution. FIG. 11 shows in perspective view part of a delay line on a cylindrical core 14, with grounding tab 15 connected to a slip ring 30 and the start of the series inductor wire 18 connected to another slip-ring 32. The whole delay line may be rotated by control means (not shown) around its axis 44, with stationary sliding contact springs 40 and 42 making contact with slip rings 30 and 32, respectively. On a stationary rod 34 mounted parallel with the axis 44 slides a contact shoe 36 whose notched or hollowed contact spring 38 rides on the helical wire 18. When the delay line is rotated around its axis 44, the rugged wire 18 remains engaged with the contact spring 38 and forces the shoe 36 to slide along rod 34 with which the output terminal (not shown) is connected.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In an electrical delay line, in combination, a dielectric member of flexible dielectric sheet material of substantially oblong rectangular form; a substantially solid core means being electrically non-conductive at least along its surface for supporting from inside said dielectric member when the latter is wrapped around said core means so as to assume substantially tubular form; inductance means including a plurality of strip-shaped metal film means carried on one face of said dielectric member, spaced from each other and extending parallel with each other substantially from one longitudinal edge of said dielectric member to its opposite edge and at such an angle with respect to said edges that when said dielectric member is wrapped around said core means, said strip-shaped film means constitute a substantially continuous helix, and a continuous coil of conductive wire wound around said dielectric member wrapped around said core means so as to form a helix conforming with said helix formed by said strip-shaped metal film means and in contact therewith; and conductor means including at least one conductor member extending in substantially longitudinal direction of the delay line in intimate contact with the other face of said dielectric member, and including spaced conductor portions facing corresponding spaced portions, respectively, of said helix formed by said strip-shaped metal film means, but separated therefrom by corresponding portions of said dielectric member and forming therewith and with said corresponding spaced portions of said strip-shaped metal film means a shunt capacitance means.

2. In an electrical delay line, in combination, a dielectric member of flexible dielectric sheet material of substantially oblong rectangular form; a substantially tubular core means being electrically non-conductive at least along its surface for supporting from inside said dielectric member when the latter is wrapped around said core means so as to assume substantially tubular form, and including means for holding said dielectric member in such tubular form on said core means; inductance means including a plurality of strip-shaped metal film means carried on one face of said dielectric member, spaced from each other and extending parallel with each other substantially from one longitudinal edge of said dielectric member to its opposite edge and at such an angle with respect to said edges that when said dielectric member is wrapped around said core means, said strip-shaped film means constitute a conductively continuous helix; and conductor means including at least one conductor member extending in substantially longitudinal direction of the delay line in intimate contact with the other face of said dielectric member, and including spaced conductor portions facing corresponding spaced portions, respectively, of said helix formed by said strip-shaped metal film means, but separated therefrom by corresponding portions of said dielectric member and forming therewith and with said corresponding spaced portions of said strip-shaped metal film means a shunt capacitance means.

3. In an electrical delay line, in combination, a dielectric member of flexible dielectric sheet material of substantially oblong rectangular form; a substantially solid core means being electrically non-conductive at least along its surface for supporting from inside said dielectric member when the latter is wrapped around said core means so as to assume substantially tubular form; inductance means including a plurality of strip-shaped metal film means carried on one face of said dielectic member, spaced from each other and extending parallel with each other substantially from one longitudinal edge of said dielectric member to its opposite edge and at such an angle with respect to said edges that when said dielectric member is wrapped around said core means, said strip-shaped film means constitute a substantially continuous helix, and a continuous coil of conductive wire wound around said dielectric member wrapped around said core means so as to form a helix conforming with said helix formed by said strip-shaped metal film means and in contact therewith; and conductor means including at least one strip-shaped metal film extending in substantially longitudinal direction of the delay line and carried on the other face of said dielectric member, and including spaced conductor portions facing corresponding spaced portions, respectively, of said helix formed by said strip-shaped metal film means, but separated therefrom by corresponding portions of said dielectric member and forming therewith and with said corresponding spaced portions of said strip-shaped metal film means a shunt capacitance means.

4. In an electrical delay line, in combination, a dielectric member of flexible dielectric sheet material of substantially oblong rectangular form; a substantially tubular core means being electrically non-conductive at least along its surface for supporting from inside said dielectric member when the latter is wrapped around said core means so as to assume substantially tubular form, and including means for holding said dielectric member in such tubular form on said core means; inductance means including a plurality of strip-shaped metal film means carried on one face of said dielectric member, spaced from each other and extending parallel with each other substantially from one longitudinal edge of said dielectric member to its opposite edge and at such an angle with respect to said edges that when said dielectric member is wrapped around said core means, said strip-shaped film means constitute a conductively continuous helix; and conductor means including at least one strip-shaped metal film extending in substantially longitudinal direction of the delay line and carried on the other face of said dielectric member, and including spaced conductor portions facing corresponding spaced portions, respectively, of said helix formed by said strip-shaped metal film means, but separated therefrom by corresponding portions of said dielectric member and forming therewith and with said corresponding spaced portions of said strip-shaped metal film means a shunt capacitance means.

5. A delay line component, comprising, in combination, a sheet member of flexible dielectric material of substantially oblong rectangular form carrying on one face thereof a plurality of first strip-shaped metal film means, spaced from each other and extending parallel with each other substantially from one longitudinal edge of said oblong dielectric sheet member to its opposite edge and at such an angle with respect to said edges that said plurality of first strip-shaped metal film means is adapted to constitute, when said sheet member is curved along a surface of revolution, a substantially continuous conductive helix so as to form an inductance means, said sheet member carrying on its other face at least one second strip-shaped metal film means having spaced portions which face corresponding spaced portions of said first strip-shaped metal film means, but are spaced therefrom by corresponding portions of said dielectric material so that corresponding spaced portions of said first and second strip-shaped metal means facing each other form, together with said corresponding portions of said dielectric material separating them, a capacitance means.

6. In an electrical delay line having a coiled conductor forming a series inductance and having distributed shunt capacitance, in combination, a substantially tubular sheet member of dielectric material having an axis; first and second metal film electrodes, the first of said electrodes forming at least part of the coiled conductor, and the other one of said electrodes being connectable to ground, said first metal film electrode being arranged on the outer face of said sheet member and comprising a plurality of regularly spaced metal film portions in intimate contact with said one face of said sheet member and extending parallel with each other at a predetermined angle with respect to the direction of said axis so as to extend substantially along a helix about said axis, and said second metal film electrode being arranged on the other face of said sheet member and comprising at least one metal film portion in intimate contact with said other face of said sheet member and at least partly confronting said metal film portions of said first metal film electrode on said first face of said sheet member; core means being non-conductive at least along its circumference and conforming with said substantially tubular sheet member to support it from the inside; and a continuous coil of conductive wire wound around said substantially tubular sheet member on said core means so as to form a helix conforming with said helix formed by said first metal film electrode and in contact therewith, said wire coil constituting another part of the coiled conductor, so that the shunt capacitance in said sheet member is confined to the sheet portions located between said mutually confronting portions of said first and second metal film electrodes.

7. In an electrical delay line having a coiled conductor forming a series inductance and having distributed shunt capacitance, in combination, a continuous helical coil means of conductive material having a longitudinal axis and constituting a part of the coiled conductor; a strip-shaped sheet member of dielectric material extending in direction of said axis and adjacent to said coil means; and first and second metal film electrodes, the first of said electrodes forming another part of the coiled conductor, and the other one of said electrodes being connectable to ground, said first metal film electrode being arranged on one face of said sheet member and comprising a plurality of regularly spaced metal film portions in intimate contact with said one face of said sheet member, different of said regularly spaced metal film portions being also in intimate contact at least with portions of different turns, respectively, of said coil means, and said second metal film electrode being arranged on the other face of said sheet member and comprising at least one continuous metal film strip in intimate contact with said other face of said sheet member and at least partly confronting said metal film portions of said first metal film electrode on said first face of said sheet member, so that the shunt capacitance in said sheet member is confined to the sheet portions located between said mutually confronting portions of said first and second metal film electrodes.

8. In an electrical delay line having a coiled conductor forming a series inductance and having distributed shunt capacitance, in combination, longitudinal core means being non-conductive at least along the surface and having a longitudinal axis; a continuous helical coil means of conductive material wound about said core means and constituting a part of the coiled conductor; a strip-shaped sheet member of dielectric material extending in direction of said axis and adajacent to said coil means; and first and second metal film electrodes, the first of said electrodes forming another part of the coiled conductor, and the other one of said electrodes being connectable to ground, said first metal film electrode being arranged on one face of said sheet member and comprising a plurality of regularly spaced metal film portions in intimate contact with said one face of said sheet member, different of said regularly spaced metal film portions being also in intimate contact at least with portions of different turns, respectively, of said coil means, and said second metal film electrode being arranged on the other face of said sheet member and comprising at least one continuous metal film strip in intimate contact with said other face of said sheet member and at least partly confronting said metal film portions of said first metal film electrode on said first face of said sheet member, so that the shunt capacitance in said sheet member is confined to the sheet portions located between said mutually confronting portions of said first and second metal film electrodes.

9. In an electrical delay line, in combination, coiled conductor means constituting part of a series inductance; capacitor means assembled with said coiled conductor means and including an elongated member of dielectric sheet material extending along, and adjacent to, said coiled conductor means and carrying a plurality of pairs of metal film portions arranged respectively on one and the other face of said sheet material and in intimate contact therewith, said metal film portions of each pair thereof confronting each other and being separated by a corresponding portion of said sheet material, different metal film portions on one face of said sheet material being in contact with different turns, respectively, of said coiled conductor, thus constituting another part of said series inductance; and conductor means connecting all of said metal film portions on the other face of said sheet material with each other and adapted to be connected to ground, so that the portions of said sheet material located between said pairs of metal film portions constitute a shunt capacitance.

10. In an electrical delay line, in combination, a dielectric member of flexible dielectric sheet material tape wound helically along a surface of revolution about an axis extending longitudinally of the delay line; inductance means including helical strip-shaped metal film means carried on one face of helically wound tape of said dielectric sheet material, and a continuous coil of conductive wire wound around said dielectric member as a helix conforming with said helically wound tape and in contact therewith; and conductor means including at least one conductor member extending in substantially longitudinal direction of the delay line in intimate contact with the other face of said dielectric member, and including spaced metal film portions carried on said other face of said dielectric sheet material tape and facing corresponding spaced portions, respectively, of said helical strip-shaped metal film means, but separated therefrom by corresponding portions of said dielectric tape and forming therewith and with said corresponding spaced portions of said strip-shaped metal film means a shunt capacitance means.

11. In an electrical delay line having a coiled conductor forming a series inductance and having distributed shunt capacitance, in combination, core means being nonconductive at least along its circumference and having a longitudinal axis; a tape member of dielectric material wound helically about said core means; and first and second metal film electrodes, the second one of said electrodes forming at least part of the coiled conductor, and the other one of said electrodes being connectable to ground, said first metal film electrode being arranged on the inner face of said tape member and comprising a plurality of regularly spaced metal film portions in intimate contact with said one face of said sheet member, and said second metal film electrode being arranged on the other face of said sheet member and comprising at least one continuous metal film in intimate contact with said other face of said sheet member and at least partly confronting said metal film portions of said first metal film electrode on said first face of said sheet member, so that the shunt capacitance in said sheet member is confined to the sheet portions located between said mutually confronting portions of said first and second metal film electrodes.

12. In a variable electrical delay line, in combination, a dielectric member of flexible dielectric sheet material curved along a surface of revolution about an axis extending longitudinally of the delay line, and including one elongated helical sheet portion of said dielectric sheet material; core means being electrically non-conductive at least along its surface for supporting from inside said dielectric member when the latter is mounted around said core means, said core means being rotatably supported; inductance means including helical strip-shaped metal film means carried on one face of said helical sheet portion of said dielectric member, and a continuous coil of conductive wire wound around said dielectric member so as to form a helix conforming with said helical strip-shaped metal film means and in contact therewith; sliding terminal contact means movable in longitudinal direction of the delay line and adapted to be continuously in sliding contact with said conductive wire so as to engage different portions of said wire when said core means are rotated; and conductor means including at least one conductor member extending in substantially longitudinal direction of the delay line in intimate contact with the other face of said dielectric member, and including spaced conductor portions facing corresponding spaced portions, respectively, of said helix formed by said strip-shaped metal film means, but separated therefrom by corresponding portions of said dielectric member and forming therewith and with said corresponding spaced portions of said strip-shaped metal film means a shunt capacitance means.

References Cited by the Examiner

UNITED STATES PATENTS

| | | | |
|---|---|---|---|
| 2,111,710 | 3/38 | Van Loon | 333—31 |
| 2,416,683 | 3/47 | Fruch et al. | 333—31 |
| 2,441,960 | 5/48 | Eisler | 333—84 |
| 2,457,212 | 12/48 | Di Toro | 333—31 |
| 2,461,061 | 2/49 | Kallmann | 174—113 |
| 2,751,558 | 6/56 | Grieg | 333—84 |
| 2,915,718 | 12/59 | Grieg | 333—84 |
| 2,922,123 | 1/60 | Cohn | 333—84 |
| 2,951,218 | 8/60 | Arditi | 333—10 |

FOREIGN PATENTS

| | | |
|---|---|---|
| 632,834 | 12/49 | Great Britain. |
| 793,793 | 4/58 | Great Britain. |

HERMAN KARL SAALBACH, *Primary Examiner.*